United States Patent [19]

Pearse, Jr.

[11] Patent Number: 4,679,411
[45] Date of Patent: Jul. 14, 1987

[54] STEPPED CAPACITY CONSTANT VOLUME BUILDING AIR CONDITIONING SYSTEM

[75] Inventor: Richard H. Pearse, Jr., La Crosse, Wis.

[73] Assignee: American Standard Inc., New York, N.Y.

[21] Appl. No.: 251,620

[22] Filed: Apr. 6, 1981

Related U.S. Application Data

[63] Continuation-in-part of Ser. No. 934,156, Aug. 16, 1978, Pat. No. 4,259,847, which is a continuation-in-part of Ser. No. 789,480, Apr. 21, 1977, abandoned.

[51] Int. Cl.$^4$ ............................................. F25B 39/02
[52] U.S. Cl. ...................................... 62/519; 62/428; 62/504; 62/507
[58] Field of Search ....................... 165/140, 144, 151; 62/519, 507, 428, 510, 504

[56] References Cited

U.S. PATENT DOCUMENTS

| | | | |
|---|---|---|---|
| 2,474,304 | 6/1949 | Clancy | 62/6 |
| 2,857,747 | 10/1958 | McCracken et al. | 62/335 |
| 3,365,902 | 1/1968 | Nussbaum | 62/155 |
| 3,370,438 | 2/1968 | Hopkinson | 62/196 |
| 3,392,541 | 7/1968 | Nussbaum | 62/184 |
| 3,430,453 | 3/1969 | Norton | 62/196 |
| 3,866,439 | 2/1975 | Bussjager et al. | 62/504 |
| 3,885,938 | 5/1975 | Ordonez | 62/196 |

FOREIGN PATENT DOCUMENTS

6275/1972 9/1969 Japan.

Primary Examiner—Ronald C. Capossela
Attorney, Agent, or Firm—William J. Beres; Carl M. Lewis

[57] ABSTRACT

An air conditioning system is disclosed in which the air conditioning capacity is stepped to a lower level upon reduced sensible air conditioning demand. The stepped reduction involves both a stepped reduction of blower capacity and a stepped change of the heat exchange fluid flow at the heat exchanger modifying the temperature of the air. Several embodiments are disclosed.

7 Claims, 6 Drawing Figures

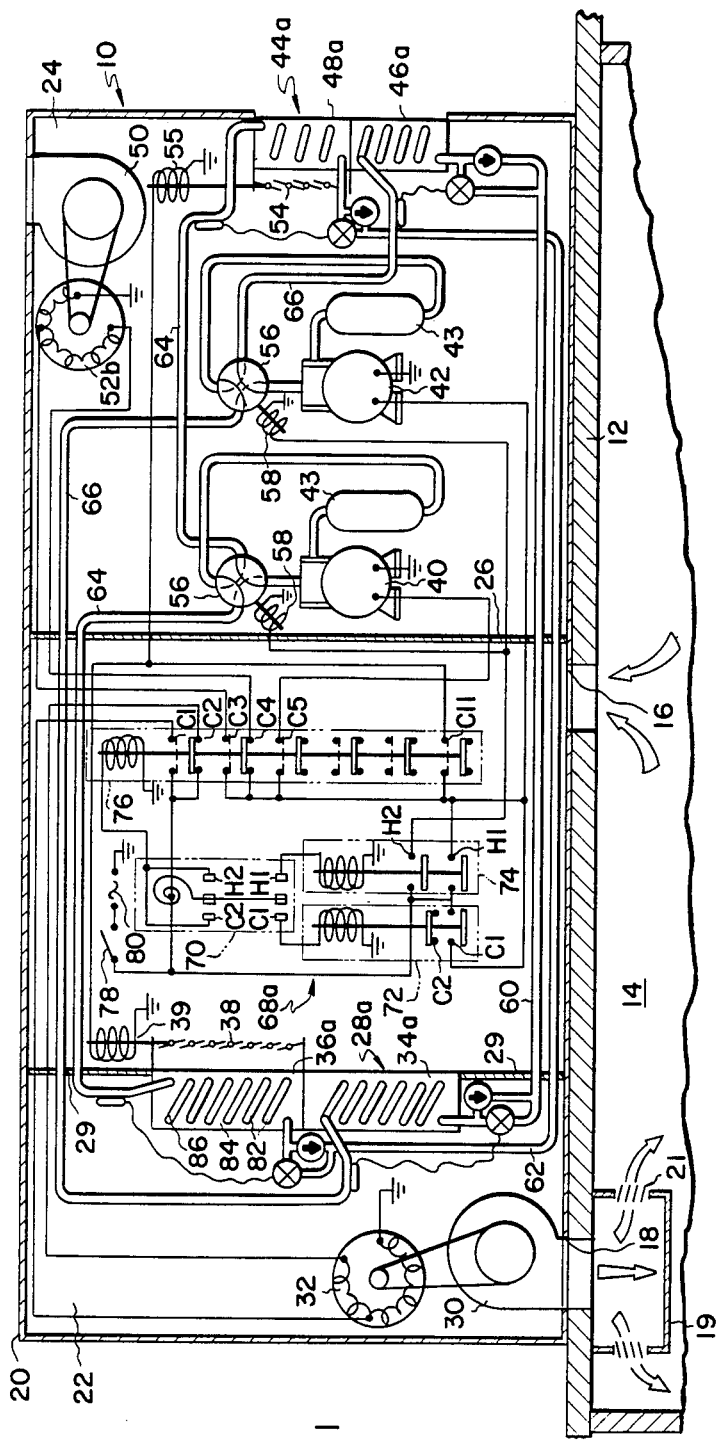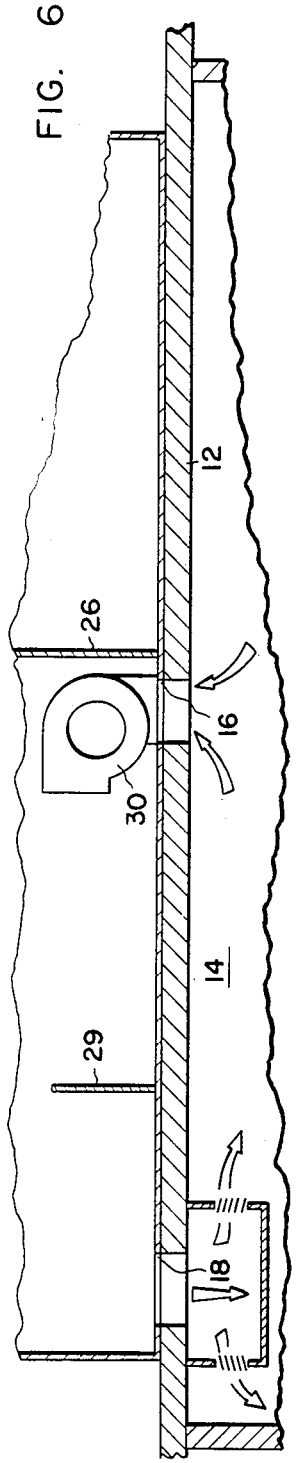

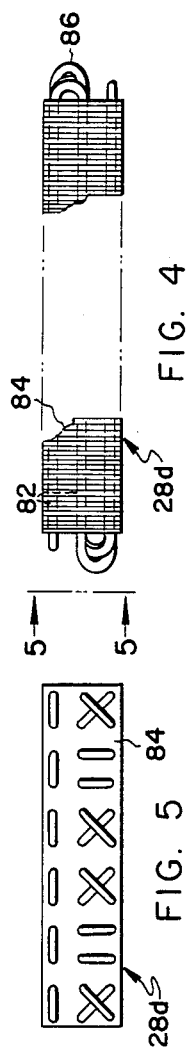
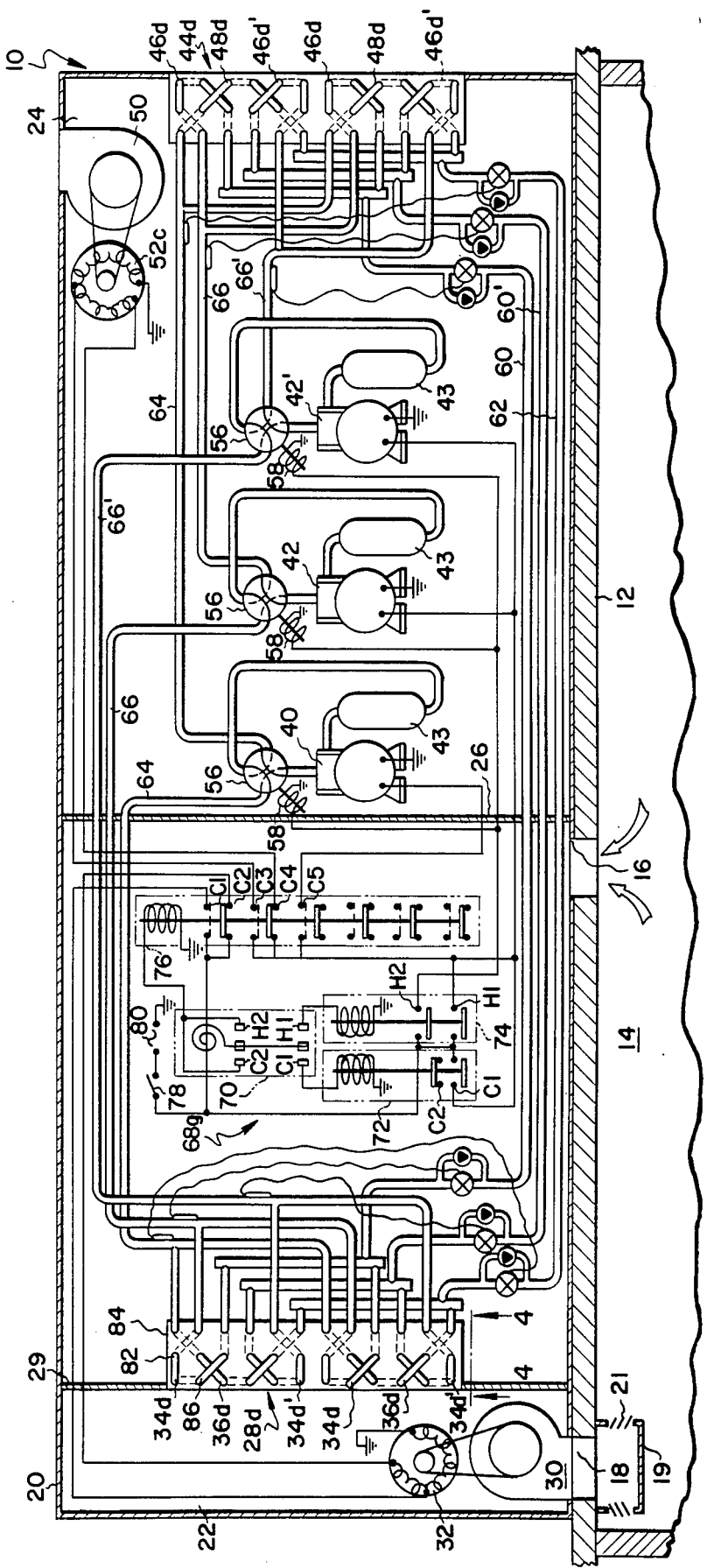
FIG. 3
FIG. 4
FIG. 5

STEPPED CAPACITY CONSTANT VOLUME BUILDING AIR CONDITIONING SYSTEM

This application is a continuation-in-part of U.S. patent application Ser. No. 934,156, now U.S. Pat. No 4,259,847 filed Aug. 16, 1978 which is a continuation-in-part of U.S. patent application Ser. No. 789,480, filed Apr. 21, 1977 now abandoned.

BACKGROUND OF THE INVENTION

Historically, building air conditioning systems have employed several schemes of capacity control.

One such scheme is to supply air at a constant volume to the conditioned space. As the building air conditioning load varies, the temperature of the air supply is varied. While some systems provide precise humidity control via reheat, others provide no humidity control. The system is relatively low in cost and simple to design. Where humidity control via reheat is employed, operating costs may be expensive.

Another system which is in use is known as a variable air volume system. In this system, the volume of the air is infinitely and continuously varied on a room-by-room or zone-by-zone basis usually while the supply air temperature remains constant. This requires that the volume of building supply air from its source will vary continuously in accordance with the total needs of the area served by the source. It will be evident that such systems can also provide zone temperature control flexibility. Another advantage over the constant volume system that may be achieved in variable air volume systems is an energy savings resulting from reduced air flow during periods of reduced air conditioning demand. A major disadvantage of the variable air volume system is its initial cost. In many buildings a variable air volume system cannot be jusitifed for one or more of several reasons. The absence of a need for individual zone temperature control may be one. The initial cost may be another. The complexity of designing the system and selecting the components may be still another.

SUMMARY OF THE INVENTION

The instant invention is basically a constant volume system from the standpoint of design complexity and initial cost. It has, however, certain advantages over conventional constant volume systems in the areas of reduced operating costs and energy consumption. Satisfactory humidity control may be achieved without reheat and evaporator frosting is avoided. The instant invention involves a stepped reduction in blower capacity and a stepped change in heat exchange fluid flow at the air tempering heat exchanger.

It is an object of this invention to provide an air conditioning system with improved energy efficiency by operating the blower at reduced capacity.

It is a further object of this invention to provide in an air conditioning system which is operated at low blower capacity, means to prevent frosting of the evaporator heat exchanger.

It is also an object of this invention to provide in an air conditioning system operated at low blower capacity, means to maintain low cooling heat exchanger temperatures whereby a lower wet bulb air temperature may be achieved, as compared to systems wherein refrigerant flow alone is used for capacity control.

And it is still a further object of this invention to provide a constant volume air conditioning system which has a low initial cost, improved operating efficiency and improved humidity control.

The invention is directed to a system in which the air volume is controlled at its source in response to the air tempering loads rather than in response to the sum of the volume demanded by several zones as in a variable air volume system. More specifically, the blower capacity is staged at discrete levels of constant air volume. The staging does not alter the ability of the system to produce a conditioned air having a wet bulb temperature as low as may be obtained at other levels of operation. Under most operating conditions a lower wet bulb temperature will be achieved by use of this invention as compared to systems wherein refrigerant flow alone is used for capacity control. A multispeed motor is employed to affect reduction of blower speed with consequent reduction in air flow at the air tempering or indoor heat exchanger.

The invention contemplates the operation of a constant volume air conditioning system under a reduced but steady air volume mode which is simultaneously accompanied by a reduced flow of tempering heat exchange fluid to the air temperating heat exchanger. In most embodiments the flow of heat exchange fluid is reduced to that which is commensurate with the reduced air volume which causes the air temperating heat exchanger to affect the sensible and latent heat load in generally similar proportions as it did when the system was operated at a higher capacity level. The change in tempering heat exchange fluid flow is accomplished by a reduction in compressor capacity. This is accomplished by selective compressor operation, compressor unloading or compressor speed reduction. In order to prevent evaporator frosting and to make full use of the reduced air flow at reduced volume, one embodiment provides a damper at the evaporator.

This invention more specifically involves an air conditioning system for an enclosure comprising: a duct, inlet means for admitting air to said duct; outlet means for discharging air from said duct; a blower means for circulating air through said duct to said enclosure; a blower motor drivingly connected to said blower means; a refrigerant evaporator heat exchanger disposed within said duct for cooling and dehumidifying air circulated therethrough by said blower means and having plural refrigerant conducting tubes spanning through fins each of which is common to and in direct heat transfer relation with each of said tubes; means for supplying a refrigerant fluid to each of said tubes; and system control means responsive to a condition indicative of the air condition within said enclosure for discontinuing the supply of refrigerant to a first portion of said tubes and for reducing the speed of said blower motor in about the same proportion; said first portion of said tubes being less than all of said tubes and consisting of a plurality of said tubes which are generally uniformly dispersed across the path of air circulated through said evaporator heat exchanger whereby the ratio of sensible cooling capacity to the total of sensible and latent cooling capacity for said air conditioning system remains generally uniform despite a stepped reduction of sensible and latent cooling capacities.

This invention further involves a method of controlling an air conditioning system having an evaporator heat exchanger and means for passing air to be cooled and dehumidified over the heat exchanger comprising the steps of: sensing a full demand for cooling; in response to said sensed full demand for cooling, supplying a refrigerant to substantially all portions of said heat exchanger and supplying a full supply of air to be conditioned across substantially the entire heat exchanger; sensing a reduced demand for cooling; in response to said reduced demand for cooling, terminating the refrigerant supply to a discrete but substantially uniformly distributed partial portion of said heat exchanger and reducing the supply of air across substantially the entire heat exchanger.

DESCRIPTION OF THE DRAWINGS

Other objects and advantages will become apparent as this specification describes the invention with reference to the drawing in which like numerals have been used to designate like elements throughout and wherein:

FIG. 1 is a schematic of a first embodiment of a rooftop air conditioning unit utilizing multiple refrigerant circuits and compressors arranged for cooling and heating;

FIG. 3 is a schematic of another embodiment of my invention also disclosed in a rooftop type air conditioning unit wherein three separate refrigerant circuits are shown; one of which is dispersed throughout and embraces the entire face of the indoor heat exchanger while the other two separately embrace only portions of the indoor heat exchanger;

FIG. 4 is a bottom view of the indoor heat exchanger viewed along line 4—4 of FIG. 3 and rotated clockwise by one-quarter turn;

FIG. 5 is a side view of the indoor heat exchanger taken along line 5—5 of FIG. 4; and FIG. 6 is a variation of the preceding embodiments showing the indoor heat exchanger blower in a blow-through position.

DETAILED DESCRIPTION

Figure 2:
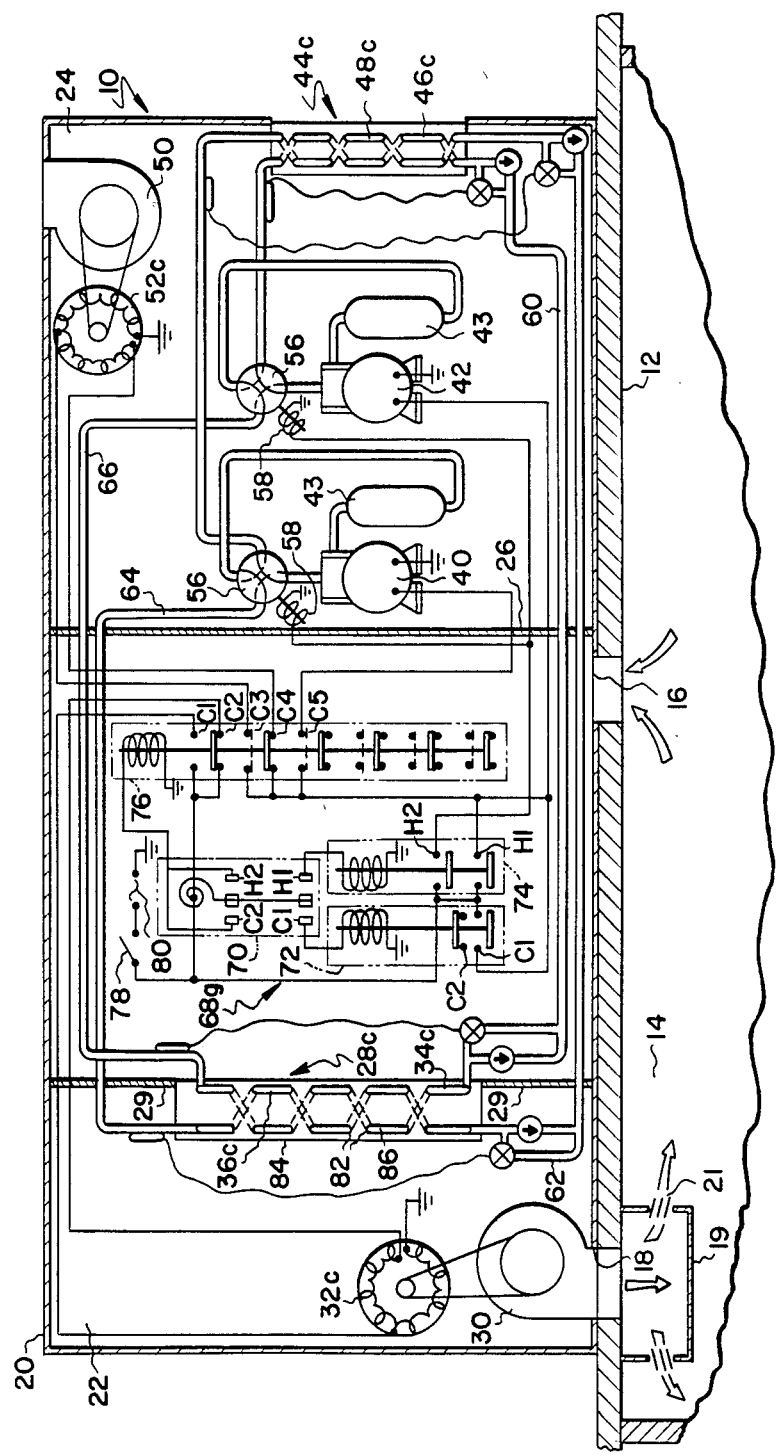
FIG. 2 is a schematic of a second embodiment of a rooftop air conditioning unit similar to the first embodiment wherein each of the two separate refrigerant circuits thereof is dispersed throughout and embraces the entire face of the indoor heat exchanger.

Now with reference to FIG. 1, it will be seen that a rooftop air conditioner 10 is supported upon a roof 12 of a building containing a space 14 to be conditioned.

The air conditioned has a generally rectangular housing 20 which is divided by partition 26 into a conditioned space air tempering chamber 22 and a tempering fluid source chamber 24.

An air tempering heat exchanger or indoor air heat exchanger 28a, which is of the fin and tube type, is disposed in the air tempering chamber 22 between first 16 and second 18 apertures in housing 20. The apertures communicate through aligned openings in roof 12 with the conditioned space 14. An indoor air centrifugal blower 30 is arranged to circulate air from the space 14 through openings 16 and into the chamber or duct 22, over the indoor air heat exchanger, and back to the conditioned space 14 via enclosure distribution conduit 19 and fixed registers 21. Partition 29 prevents air from by-passing the indoor air heat exchanger. Blower 30 is drivingly connected to a four-and-six-pole blower motor 32 which operates at nominal speeds of 1750 or 1167 revolutions per minute, depending upon the number of activated poles when connected to a sixty cycle per second power source. It will be appreciated that these nominal speeds will be proportionally lower when the power source is at a low frequency as, for example, fifty cycle per second.

The indoor heat exchanger 28a has first 34a and second 36a portions each of which encompasses a separate facial area of the heat exchanger 28a and has a refrigerant circuit separate from the other portion. The air passing over the first portion 34a thus is in parallel flow relation to the air passing over the second portion 36a.

A damper 38 activated by an operator 39 is positioned to shut off the air flow over the second portion 36a. The energizing of the operator 39 opens the dampers 38.

The heat exchange fluid or refrigerant for indoor air heat exchanger 28a is supplied from fluid source chamber 24 which contains first 40 and second 42 compressors each having a refrigerant accumulator 43. Also associated with and preferably in chamber 24 is a source or outdoor heat exchanger 44a, also of the fin and tube type, having first 46a and second 48a portions, each of which covers a separate facial area of the heat exchanger and has a refrigerant circuit separate from the other portion.

Disposed within chamber 24 is a centrifugal blower 50 which is arranged to circulate atmospheric air over the outdoor heat exchanger 44a. Blower 50 is drivingly connected to a four-and-six-pole blower motor 52b. A damper 54, actuated by an operator 55, is positioned to shut off the air flow over the second portion 48a. The energizing of operator 55 opens the damper 54.

In the embodiment of the invention shown in FIG. 1, the compressors and indoor and outdoor heat exchanger portions are shown connected in two separate circuits as reverse cycle heat pumps through reversing valves 56 which are actuated to the heating cycle by the energizing of actuators 58. A first liquid line 60 with appropriate throttling means and check valves connects heat exchanger portions 34a and 46a while liquid line 62 in similar manner connects heat exchanger portions 36a and 48a. The suction and discharge sides respectively of compressor 42 are connected through gas line 66 via a four-way reversing valve 56 to the first portions 34a and 46a of either indoor and outdoor heat exchangers 28a and 44a respectively thereby permitting one of the first portions to function as a refrigerant evaporator while the other first portion functions as a refrigerant condenser. Compressor 40 and the second portions 36a and 48a of the indoor and outdoor heat exchangers are similarly connected through gas line 64.

A control system 68a is shown for controlling the motors 32 and 52b, compressors 40 and 42, reversing valve actuators 58 and damper operators 39 and 55 in response to the sensible load.

The control system shown includes a two-stage heating-cooling thermostat 70, a cooling cycle relay 72, a heating cycle relay 84, and a staging relay 76. The bimetallic temperature sensing element of thermostat 70 is positioned to sense the temperature of the air returning to the indoor heat exchanger so as to sense the sensible thermal load imposed upon the air conditioning system. The thermostat 70 may either energize the cooling relay 72 or heating relay 74, respectively, depending upon whether the load demands cooling or heating. Thermostat 70 also may position the staging relay into the de-energized position shown for low capacity operation or energized position, shown by dashed line, for high capacity operation.

The operation of the system is as follows. Upon closure of switch 78, electric power flows from an alternating current source 80, through switch 78, through contacts C2 of relay 76 to energize the six pole winding of motor 32 thereby driving blower 30 to circulate air at low volume. Should the temperature as sensed by thermostat 70 rise above the first stage cooling set point, contact C1 of thermostat 70 closes completing a circuit including source 80, switch 78, bimetal element of thermostat 70, contact C1 of thermostat 70, and the winding of relay 72 to thereby energize the winding of cooling relay 72 thereby closing the contact C1 and opening contact C2 of relay 72. A circuit is thus completed which includes power source 80, switch 78, contact C1 of relay 72, and compressor 42 to energize the low stage compressor. Another circuit is completed which includes power source 80, switch 78, contact C1 of relay 72, contact C4 of relay 76 to the six pole winding of motor 42b thereby energizing blower 50 at low speed. Dampers 38 and 54 remain closed so that the air moved by blowers 30 and 50 passes only over first portions 34a and 46a of the indoor and outdoor heat exchangers, respectively.

Should the temperature as sensed by thermostat 70 rise to the second stage cooling set point, contact C2 thereof will also close thereby energizing a circuit including power source 80, switch 78, contact C2 of thermostat 70, and the winding of relay 76 thereby energizing relay 76 to the dashed line position. The energizing of relay 76 establishes a circuit including power source 80, switch 78, contact C1 of relay 76 and the four pole winding of motor 32 which is then energized to drive blower 30 at high speed. It will also be noted that contact C2 of relay 76 is opened. Energizing of relay 76 also establishes a circuit including power source 80, switch 78, contact C1 of relay 72, contact C3 of relay 76 and the four-pole winding of second blower motor 52b to drive blower 50 at high speed. Again it will be noted that the contact C4 of relay 76 is opened. Energizing of relay 76 also closes a circuit including power source 80, switch 78, contact C1 of relay 72, contact C5 of relay 76 and compressor 40 to thereby activate the refrigeration circuit associated with the second portions 36a and 48a of the indoor and outdoor heat exchangers, respectively. Energizing of relay 76 still further establishes a circuit including, power source 80, switch 78, contact C1 of relay 72, contact C11 of relay 76 and each of damper actuators 39 and 55 to actuate dampers 38 and 54 to the open position.

It will thus be seen that the system when operated at the second stage cooling produces about twice the capacity as upon the first stage and has about twice the air flow through the unit. The ratio between sensible and latent cooling remains substantially the same whether the system is operated at high or low capacity. Furthermore, because the air flowing over the heat exchanger portion 34a remains generally in proportion to the amount of refrigerant flow, i.e., one-half the full air flow is heat exchanged with the refrigerant circulated by one-half the compressors, the heat exchanger portion 34a will not have any more tendency to frost up at low capacity than at high capacity with the same entering air conditions.

Should the temperature as sensed by thermostat 70 fall below the second stage cooling set point, contacts C1 of thermostat 70 will open thereby placing the system into the low capacity cooling mode as hereinbefore described.

Should the temperature as sensed by thermostat 70 fall below the first stage cooling set point, contact C1 of thermostat 70 will open to de-energize relay 72 thereby shutting the system off except for operation of the blower motor 32 under six pole operation as hereinbefore described.

Should the temperature as sensed by thermostat 70 fall below the first stage heating set point, contact H1 of thermostat 70 will be closed to energize relay 74 thereby closing contacts H1 and H2 of relay 74. Closure of contact H1 of relay 74 completes the same circuits as did closure of contact C1 of relay 72. However closure of contact H2 of relay 74 establishes a circuit including power source 80, switch 78, contact H2 of relay 74 and reversing valve actuators 58 thereby causing the refrigerant to flow in the indoor and outdoor heat exchangers in the reverse direction as a heat pump thereby causing the air circulated by blower 30 to be the heated rather than cooled.

Should the temperature as sensed by thermostat 70 fall below the second stage heating set point, contact H2 of thermostat 70 will also be closed thereby placing the system in the high capacity mode just as did closure of contact C2 of thermostat 70 as hereinbefore described. Further, as the heating demand drops, the thermostat contacts H2 and H1 will successively open to bring the system back to the original condition with only the indoor heat exchanger blower 30 operating at low speed.

The embodiment of FIG. 2 is similar to embodiment of FIG. 1. Only departures from the embodiment of FIG. 1 will be specifically described with respect to the other embodiments for purposes of brevity and simplicity. It differs from that embodiment as the separate portions 46c and 48c are each interspersed throughout and embrace the entire face of the heat exchanger 44c and portions 34c and 36c are each interspersed throughout and embrace the entire face of the heat exchanger 28c. It will be evident that the tubes 82 of, for example, portion 34c are serially arranged and both upstream and downstream of the tubes 82 of portion 36c with respect to the air passed over heat exchanger 28c by blower 30. Blower motor 52c is of the four-and-eight pole type. Blower motor 32c having four-and-eight poles effects an air reduction commensurate with the reduction in refrigerant flow. The operation of control system 68g is the same as 68a except that no damper operators are involved.

FIGS. 3–5 show a variation of the embodiment of FIG. 2. In this embodiment three compressors, 40, 42 and 42' are arranged in three separate refrigerant circuits.

A first separate refrigerant circuit is comprised of compressor 40 connected via reversing valve 56 to refrigerant gas line 64 which interconnects heat exchanger circuit portions 48d of outdoor heat exchanger 44d to heat exchanger circuit portions 36d of indoor heat exchanger 28d while liquid line 62 interconnects via conventional expansion valves and bypass check valves the circuit portions 48d to 36d.

A second separate refrigerant circuit is comprised of compressor 42' connected via reversing valve 56 to refrigerant gas line 66 which interconnects heat exchanger circuit portions 46d of outdoor heat exchanger 44d to heat exchanger circuit portions 34d of indoor heat exchanger 28d while liquid line 60 interconnects via conventional expansion valves and bypass check valves the circuit portions 46d and 34d.

A third separate refrigerant circuit is comprised of compressor 42' connected via reversing valve 56 to refrigerant gas line 66' which interconnects heat exchanger circuit portions 46d' of outdoor heat exchanger 44d to heat exchanger circuit portions 34d' of indoor heat exchanger while liquid line 60' interconnects via conventional expansion valves and bypass check valves the circuit portions 46d' and 34d'.

All of the heat exchangers herein disclosed are comprised of vertically extending parallel plates or fins 84 through which horizontal tubes 82 extend which are interconnected via conventional U-bends 86. FIGS. 4 and 5 show more of these details of heat exchanger 28d.

It will be noted that the circuits in the upper half of heat exchanger 28d are repetitious of the circuits in the lower half. Such repeated circuits are interconnected by appropriate headers. It will be understood that in typical practice many such repetitions may exist. However, for purposes of this specification, repeated circuits of like kind and arrangement are to be considered as one circuit portion of the heat exchanger. The comments are also applicable to heat exchanger 44d. Thus for purposes of understanding the circuits of heat exchanger 28d the upper half may be considered as a complete heat exchanger.

Circuit portion 36d is interspersed throughout and embraces the entire face of the whole of heat exchanger 28d. In the embodiment of FIG. 3, compressors 42 and 42', are connected to circuit portions 34d and 34d' respectively, which when taken together are interspersed throughout and embrace the entire face of the whole of heat exchanger 28d.

The control of compressor 40 of FIG. 3 is similar to the control of compressor 40 of FIG. 2 while the control of compressors 42 and 42' of FIG. 3 is similar to the control of compressor 42 of FIG. 2. Assuming that the compressors are similarly sized, it will be seen that the refrigerant flow is reduced by ⅓ capacity by de-energizing compressor 40 at low loads. Blower motor 32 is reduced ⅓ in speed by being switched from four to six pole operation. Thus, it may be summarized that a ⅓ reduction in blower motor speed and air flow is also accompanied by a ⅓ reduction in the number of tubes 82 in the evaporator heat exchanger being supplied. In the embodiment of FIG. 2 the reduction in active tubes and air flow at the indoor heat exchanger is ½.

Unlike conventional modulation means, this invention pertains to a unique combination of evaporator circuit control and air flow control which can permit the evaporator to continue to operate at reduced loads at essentially the same evaporator temperatures as under full load.

Thus in conventional systems using only air flow modulation, the evaporator temperature drops with reduced air flow thereby causing the evaporator to frost up under appropriate humidity conditions. In other conventional systems wherein some intertwined or interspersed circuits are deactivated, without commensurate air flow reduction, the evaporator temperature rises thereby increasing the sensible heat ratio of the evaporator which may be defined as the sensible cooling capacity divided by the total (sensible and latent) cooling capacity.

Thus by use of the teaching of this invention it is possible upon reduced load operation to operate an air conditioning unit to reduce the probability of evaprator freeze up, to maintain a comfortable humidity condition and save energy by way of reduced blower and compressor power. Moreover, by use of the teachings of the embodiments of FIGS. 2 and 3, it is possible to achieve these results without the use of the dampers at the indoor heat exchanger of FIG. 1.

FIG. 6 shows a variation applicable to all of the preceding embodiments. This variation repositions the blower 30 in upstream relation to the indoor heat exchanger.

It is contemplated that the percent reduction in air flow from full load need not be identical to the percent reduction in refrigerant flow from full load. However, the differences between the percents of reduction from full load must not exceed 17% of full flow values.

It will thus be seen that the various embodiments provide for reduced blower capacity which substantially reduce blower energy consumption.

It has also been observed that the invention is applicable to the low cost constant volume type system.

Further, it has been noted that on those embodiments using a direct expansion evaporator, provisions have been made to prevent evaporator frosting due to insufficient air side flow which might otherwise accompany lower blower capacity operation.

And finally, it will be observed that even with lower capacity operation, the indoor evaporator heat exchanger may be operated at lower temperatures than many conventional systems to thereby provide improved dehumidification.

It is contemplated that other variations may be devised. Thus, in some embodiments it may be desirable to forego the use of a multispeed motor and use a single speed motor for the blower at the outdoor heat exchanger. The system might be staged for more than two levels of operation. The system might be operated strictly as a cooling system or as a heating system. Still further, it will be appreciated that the controls have been shown in a simplified and schematic manner to illustrate the basic manner of operation. Many refinements and variations of the controls are possible. For example, a time delay device may be added to delay energization of the low speed winding of the multispeed motors after the high speed winding is disconnected so as to avoid damage to the motor and avoid objectionable noise. The temperature sensing element may be located in the enclosure. A time delay may be associated with the dampers to avoid momentary unduly low suction pressure which may cause the refrigerant system low pressure cutout to be actuated. It is entirely possible to combine many of the desirable features of the prior art with those features detailed herein. Such an example would be to make provision for circulating at times only fresh air and exhausting all return air during which time the dampers on the indoor heat exchanger would be opened.

Thus it will be understood that many variations are possible without departing from the scope or spirit of the invention and I accordingly desire that my invention be limited only by the claims:

I claim:

1. A vapor compression refrigeration system comprising: evaporator means for evaporating refrigerant; compressor means for compressing vaporous refrigerant; low pressure refrigerant line means for passing refrigerant from the evaporator means to the compressor means; a condenser including a plurality of generally parallel heat exchange fins and a plurality of refrigeration circuits running through the condenser generally transverse to the heat exchange fins, wherein groups of the refrigerant circuits cover in overlapping fashion the area the condenser transverse to the direction of the flow of an external heat exchange medium moving thereover; condenser-evaporator refrigerant line means for conveying condensed refrigerant from the condenser to the evaporator means; expansion means located in the condenser-evaporator line means for reducing the temperature and pressure of refrigerant passing therethrough; a plurality of high pressure refrigerant lines for passing refrigerant from the compressor means to the condenser; refrigerant distribution means in each of the high pressure refrigerant lines, wherein each group of refrigerant circuits is connected to a different distribution means; means for selectively preventing the flow of refrigerant through at least a selected one of the high pressure refrigerant lines, wherein the group of circuits connected to the distribution means in the selected refrigerant line is removable from service without appreciably reducing the effective heat exchange area of the condenser; said plurality of the refrigerant circuits being intertwined; said compressor means including a plurality of vapor compressors; and said preventing means including switch means to shut down at least one and less than all of said compressors thereby leaving another of said compressors in operation.

2. A vapor compression refrigeration system as defined by claim 1 wherein said switch means is automatically responsive to an extreme air temperature condition.

3. A vapor compression refrigeration system comprising: evaporator means for evaporating refrigerant; compressor means for compressing vaporus refrigerant; low pressure refrigerant line means for passing refrigerant from the evaporator to the compressor means; a condenser including a plurality of generally parallel heat exchange fins and a plurality of refrigerant circuits running through the condenser generally transverse to heat exchange fins, wherein groups of the refrigerant circuits cover in overlapping fashion the area of the condenser transverse to the direction of the flow of an external heat exchange medium moving thereover; condensor-evaporator refrigerant line means for conveying condensed refrigerant from the condenser to the evaporator means; expansion means located in the condenser-evaporator line means for reducing the temperature and pressure of refrigerant passing therethrough; a plurality of high pressure refrigerant lines, for passing refrigerant from the compressor means to the condenser; refrigerant distribution means in each of the high pressure refrigerant lines wherein each group of refrigerant circuits is connected to a different distribution means; means for selectively preventing the flow of refrigerant through at least a selected one of the high pressure refrigerant lines, wherein each group of circuits connected to the distribution means in the selected refrigerant line is removable from service without appreciably reducing the effective heat exchange area of the condenser; said plurality of the refrigerant circuits being interwined; a blower disposed to blow outdoor air over each of said groups of the refrigerant circuits of said condenser; blower drive motor means for driving said blower; said compressor means including a plurality of vapor compressors; said preventing means including switch means to shut down at least one of and less than all of said compressors there by leaving another of said compressors in operation; and control means for energizing said blower drive motor means when one or more of said vapor compressors is operating whereby said blower continues to pass outdoor air in heat exchange relationship with a remaining active group of said intertwined refrigerant circuits.

4. A vapor compression refrigeration system as defined by claim 3 wherein said switch means is automatically responsive to an extreme air temperature condition.

5. A vapor compression refrigeration system as defined by claim 3 including a second blower disposed to pass air over said evaporator means; a second blower drive motor means for driving said second blower; said second blower motor being primarily disposed in the air stream of said second blower.

6. A vapor compression refrigeration system as defined by claim 5 wherein said switch means is automatically responsive to an extreme air temperature condition.

7. An air conditioner for cooling air for an enclosure comprising: a first chamber; inlet means for admitting air to said first chamber; outlet means for discharging air from said first chamber; a first blower means for circulating air through said first chamber to said enclosure; a first blower motor disposed in said first chamber drivingly connected to said first blower means; a refrigerant evaporator heat exchanger disposed within said first chamber for cooling air circulated therethrough by said first blower means; a second chamber disposed horizontally adjacent said first chamber; second inlet means for admitting outdoor air to said chamber; second outlet means for discharging outdoor air from said second chamber; a second blower means for circulating outdoor air through said second chamber; a second blower motor disposed in said second chamber drivingly connected to said second blower means; a refrigerant condenser heat exchanger horizontally displaced from said refrigerant heat evaporator exchanger disposed to be cooled by outdoor air passed through said second chamber by said second blower means; said refrigerant condenser heat exchanger having plural refrigerant conducting tubes spanning through fins each of which is common to and in direct conductive heat transfer relationship with each of said tubes; a first refrigerant compressor means for supplying refrigerant fluid to a first portion of said tubes, a second refrigerant compressor means for supplying refrigerant fluid to a second portion of said tubes; and the system control means for deactivating said first refrigerant compressor means but not simultaneously deactivating said second refrigerant compressor means thereby discontinuing the supply of refrigerant to said first portion of said tubes while continuing the supply of refrigerant to said second portion of said tubes and simultaneously continuing to operate said second blower motor in said second chamber to cause said second blower means to continue to pass outdoor air in heat exchange relation with said fins which are common to and in direct conductive heat transfer relationship with tubes of both said first and second portions of said tubes.

* * * * *